(12) United States Patent
Attanasio

(10) Patent No.: US 8,782,283 B2
(45) Date of Patent: Jul. 15, 2014

(54) LAWFUL INTERCEPTION AND DATA RETENTION OF MESSAGES

(75) Inventor: Francesco Attanasio, Nocera Superiore (IT)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 0 days.

(21) Appl. No.: 13/147,508

(22) PCT Filed: Feb. 6, 2009

(86) PCT No.: PCT/EP2009/051406
§ 371 (c)(1),
(2), (4) Date: Aug. 30, 2011

(87) PCT Pub. No.: WO2010/088963
PCT Pub. Date: Aug. 12, 2010

(65) Prior Publication Data
US 2012/0089747 A1    Apr. 12, 2012

(51) Int. Cl.
*G06F 15/16* (2006.01)
*H04L 12/58* (2006.01)
*H04L 29/06* (2006.01)

(52) U.S. Cl.
CPC ............ *H04L 63/00* (2013.01); *H04L 12/5835* (2013.01); *H04L 69/08* (2013.01); *H04L 63/30* (2013.01); *H04L 51/066* (2013.01)
USPC ............ 709/246; 709/203; 709/206; 709/224

(58) Field of Classification Search
CPC .. H04M 3/2281; H04M 7/1255; H04L 63/30; H04L 65/103; H04Q 2213/13372
USPC .......................... 709/203, 206, 223–224, 246
See application file for complete search history.

(56) References Cited

U.S. PATENT DOCUMENTS

| | | | |
|---|---|---|---|
| 8,037,206 B2 * | 10/2011 | Kit Tam et al. | 709/246 |
| 8,041,022 B1 * | 10/2011 | Andreasen et al. | 379/221.1 |
| 2002/0049913 A1 * | 4/2002 | Lumme et al. | 713/201 |
| 2004/0059832 A1 | 3/2004 | Goretzki et al. | |
| 2005/0094651 A1 * | 5/2005 | Lutz et al. | 370/401 |
| 2006/0224589 A1 * | 10/2006 | Rowney et al. | 707/9 |
| 2006/0264200 A1 * | 11/2006 | Laiho et al. | 455/410 |
| 2007/0121812 A1 * | 5/2007 | Strange et al. | 379/70 |
| 2008/0267366 A1 * | 10/2008 | Mukhopadhyay et al. | 379/88.08 |

(Continued)

FOREIGN PATENT DOCUMENTS

| WO | 2007/097667 A1 | 8/2007 |
|---|---|---|
| WO | 2008/067849 A1 | 6/2008 |

OTHER PUBLICATIONS

International Search Report for PCT/EP2009/051406 mailed Oct. 22, 2009.
Written Opinion for PCT/EP2009/051406 mailed Oct. 22, 2009.

(Continued)

*Primary Examiner* — Oanh Duong
(74) *Attorney, Agent, or Firm* — Patent Portfolio Builders PLLC

(57) ABSTRACT

A method of configuring a messaging gateway to operate as an Intercepting Control Element or a Data Retention source. The method comprises the steps of receiving, at the messaging gateway, a source message addressed to a recipient and coded in a first format, converting the source message into a destination message, coded in a second format, and generating interception information data including information referred to both the source message and the destination message.

10 Claims, 5 Drawing Sheets

(56) References Cited

U.S. PATENT DOCUMENTS

| | | | |
|---|---|---|---|
| 2009/0070469 A1* | 3/2009 | Roach et al. | 709/226 |
| 2009/0130984 A1* | 5/2009 | Lee | 455/67.11 |
| 2010/0199189 A1* | 8/2010 | Ben-Aroya et al. | 715/736 |
| 2011/0176460 A1* | 7/2011 | Iovieno | 370/259 |
| 2011/0191467 A1* | 8/2011 | Imbimbo et al. | 709/224 |

OTHER PUBLICATIONS

International Preliminary Report on Patentability for PCT/EP2009/051406 mailed May 17, 2011.

ETSI, "Lawful Interception (LI); Concepts of Interception in a Generic Network Architecture," ETSI TR 101 943 v2.2.1, Technical Report, Nov. 2006, pp. 1-31, XP014039695.

ETSI, "Lawful Interception (LI); Retained Data; Requirements of Law Enforcement Agencies for handling Retained Data," ETSI TS 102 656 v1.1.2, Technical Specification, Dec. 2007, pp. 1-17, XP014040515.

ETSI, "Universal Mobile Telecommunications System (UMTS); 3G security; Lawful interception architecture and functions (3GPP TS 33.107 version 7.7.0 Release 7)," ETSI TS 133 107 v7.7.0, Technical Specification, Oct. 2007, pp. 1-89, XP014040244.

Chinese First Office Action in corresponding Chinese Patent Application No. 200980156468.7, date of issuance, Aug. 29, 2013.

Chinese Search Report issued in corresponding Chinese Patent Application No. 2009801564687, date of completion, Aug. 2, 2013.

* cited by examiner

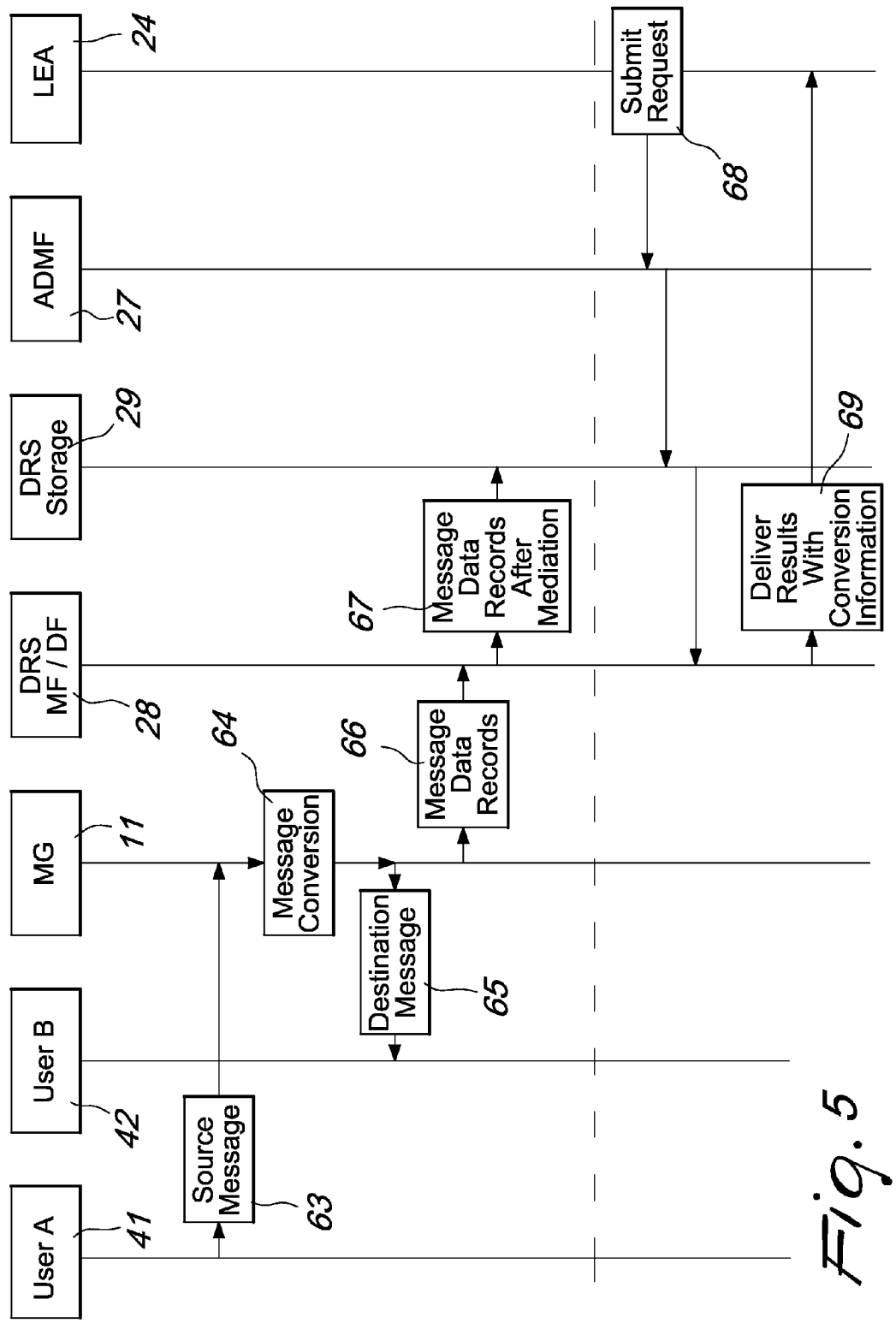

LAWFUL INTERCEPTION AND DATA RETENTION OF MESSAGES

TECHNICAL FIELD

The present invention relates to Lawful Interception and Data Retention systems, in particular to systems and method of interception of messages that may require format conversion or partial change of content when transferred from a sender to a receiver.

BACKGROUND

In many countries operators and Internet service providers are today obliged by legal requirements to provide stored traffic data generated from public telecommunications and Internet services for the purpose of detection, investigation and prosecution of crime and criminal offences, including terrorism.

Usually a public official, for instance a judge, is in charge of authorizing investigation on target persons, allowing to activate lawful interception on their communications or to query on data retention databases. The authorization paper is conventionally referred to as a "warrant", which is provided to lawful enforcement agencies.

According to a received warrant, the lawful enforcement agency (LEA) may set targets of interception and/or query data retention databases.

Messages that are object of interception or retention are managed through an architecture, referred to as messaging architecture, that allows users to exchange information irrespectively of the underlying technology and/or of the recipient's capabilities.

Such architecture may comprise a plurality of messaging servers, a dispatcher and a message store. Each server may be specific to a kind of application, for instance SMS, MMS, voice-mail, email, and so on. The dispatcher is in charge of routing information by selecting which messaging server should be used to deliver a message, according to recipient's preferences or capabilities. The message store may be a file server configured to temporarily host user messages, for instance through a mailbox folder.

This kind of architecture allows messages to flow transparently from the sender to the receiver, even if the receiver is not able to receive the original message in the format intended by the sender. For instance, the original message may be an MMS message directed to a recipient that is not able to receive MMS messages but, for example, only SMS messages.

In that case, the dispatcher may check the recipient's capabilities and may direct the SMS messaging server to convert the original MMS message into an SMS message, so that a message, though in converted form, can be delivered to the recipient.

A conventional architecture for Lawful Interception (LI) comprises an Intercepting Control Element (ICE) providing the user equipment of the target user with an access to the telecommunications network Problems with existing solutions occur when, as in the above example, a message must be converted and/or stripped of part of its content, such as when an MMS is converted into an SMS, to be delivered to the recipient.

If the recipient is the target user of a Lawful Interception system, the original message may contain richer information than it is contained in the converted message, which converted message, in current systems, represents the object of interception.

It would be desirable not to lose the richer information contained in the original message, which could be relevant for lawful interception purposes.

SUMMARY

Aim of the present invention is to overcome the above drawbacks affecting the prior art. Within this aim, object of the invention is to improve current interception systems to provide law enforcement agencies with more comprehensive information without substantially affecting performance of the telecommunications network.

This aim and other objects which will become better apparent hereinafter are achieved by a method for providing law enforcement agencies in a telecommunications network with interception or retention data related to a target user, which comprises the step of configuring a messaging gateway to operate as an Intercepting Control Element or as a Data Retention source.

According to a first aspect of the invention, the messaging gateway may receive a source message addressed to a recipient and coded in a first format, convert the source message into a destination message, coded in a second format, to be sent to the recipient, and generate interception information data including information referring to both the source message and the destination message.

The method may further comprise the preliminary step of provisioning a warrant to the messaging gateway, to initiate interception on the target user.

The generation of interception information data may include the generation of Intercept Related Information and Content of Communication; the generation of Content of Communication may involve the generation of first information related to the source message and of second information related to the destination message.

The selective generation of the first or the second information may be carried out according to a content of the warrant.

The interception information data may be converted into a format requested by law enforcement agencies.

The above aim and objects are also achieved by a Lawful Interception system for interception or retention of data related to a target user in a telecommunications network, which comprises one or more messaging gateways configured to operate as Intercepting Control Elements or Data Retention sources.

The messaging gateway may be configured to operate as an Intercepting Control Element or as a Data Retention source for a Lawful Interception system. In one embodiment, the messaging gateway may be an Enriched Messaging Gateway.

According to a further aspect of the invention, the aim and objects of the invention are also achieved by a telecommunications network comprising a Lawful Interception system which includes a messaging gateway configured to operate as an Intercepting Control Element or as a Data Retention source.

The messaging gateway may be configured to operate as Intercepting Control Element or Data retention source operable in a Lawful Interception system or with a Data Retention System by loading a computer program.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein:

FIG. 5 shows the operation of the Data Retention management system according to a preferred embodiment of the invention.

DETAILED DESCRIPTION

Figure 1:
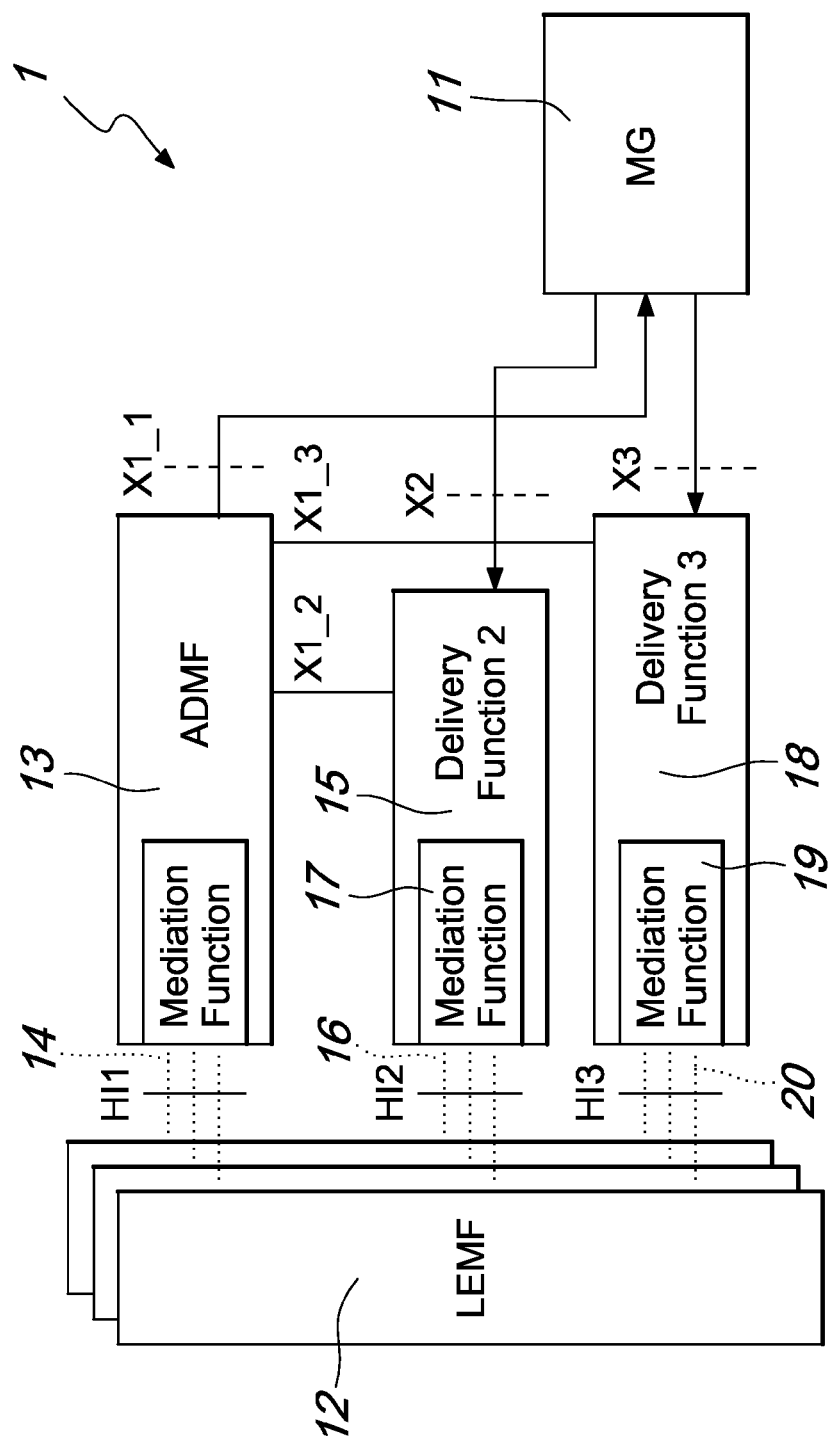
FIG. 1 is a Lawful Interception system according to an embodiment of the invention.

FIG. 1 shows a Lawful Interception (LI) system 1 for accessing communications related data according to an embodiment of the invention.

Lawful Interception system 1 comprises a Messaging Gateway 11 adapted to issue Intercept Related Information and Content of Communication involving target users.

Lawful Interception system 1 may further comprise one or more Law Enforcement Monitoring Facilities (LEMFs) 12, through which respective LEAs may receive interception information.

An Administration Function (ADMF) entity 13 may be configured for sending target identity and LI authorization data from the LEAs to the Messaging Gateway 11. ADMF 13 may interface through a first Handover Interface 14 (HI 1) with all the LEAs that may require interception in the intercepting network, while keeping intercept activities of individual LEAs separate and interfacing to the intercepting network. ADMF 13 may also be used to hide from the Messaging Gateway 11 that multiple activations by different LEAs on the same target may be in place. ADMF 13 may also be partitioned to ensure separation of the provisioning data from different agencies.

Messaging Gateway 11 may be linked to ADMF 13 by means of its own X1_1 interface, in order to perform interception, including activation, deactivation, interrogation as well as invocation, independently from other messaging gateways that may be present in the network.

In order to deliver the intercepted information to the LEAs, two Delivery Functions (DF) entities may be provided, each exchanging respective portions of information with ADMF 13, through X1_2 and X1_3 interfaces, and LEMF 12.

In particular, a DF2 entity 15 may be configured to receive Intercept Related Information (IRI) from the Messaging Gateway 11, through an X2 interface, and to convert and distribute the IRI to the relevant LEAs via a second Handover Interface 16 (HI2) by means of a Mediation Function (MF) 17.

The IRI is a collection of information or data associated with telecommunication services involving the target identity, such as call associated information or data, e.g. unsuccessful call attempts, service associated information or data, e.g. service profile management by subscriber, and location information.

A DF3 entity 18 may be configured to receive Content of Communication (CC) information from Messaging Gateway 11 through an X3 interface, and to convert and distribute such information to the relevant LEA through an MF 19 and a third Handover Interface 20 (HI3).

Figure 2:
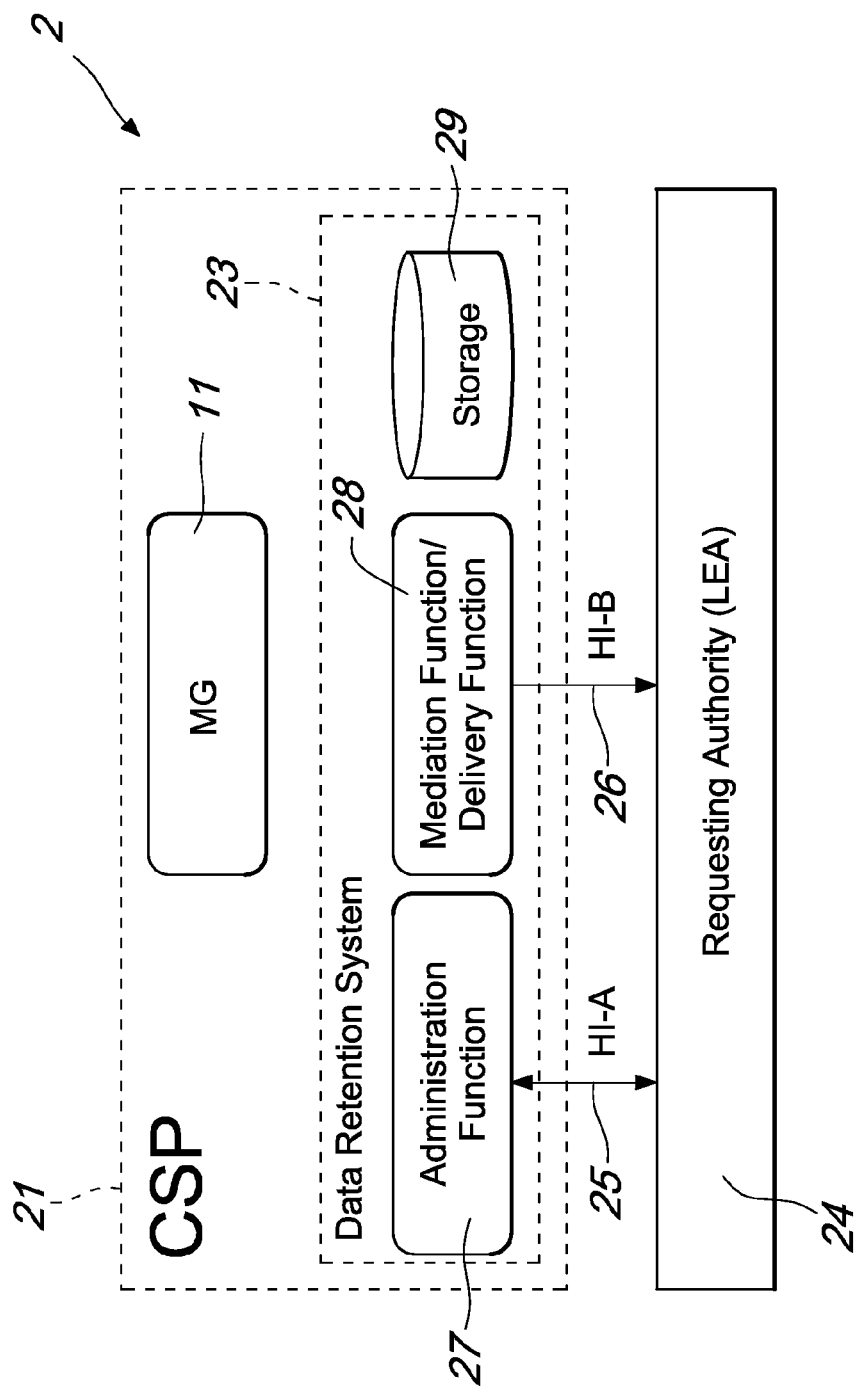
FIG. 2 is an arrangement of a service provider with Data Retention (DR) capabilities.

FIG. 2 shows another embodiment of the invention, with reference to a Data Retention (DR) System 2 in a Communication Service Provider 21 (CSP). Specifically, CSP 21, which incorporates Messaging Gateway 11, is provided with a Data Retention (DR) System 23 for exchanging retained data relating information with a Requesting Authority 24, which may be a Law Enforcement Agency (LEA).

The data exchanged between CSP 21 and Requesting Authority 24 may comprise requests from Requesting Authority 24, corresponding responses from the DR system and other DR information, such as results of requests and acknowledgments of receipt. CSP 21 and DR system 23 exchange the above data with the Requesting Authority via Handover Interfaces.

A generic Handover Interface may adopt a two-port structure in which administrative request/response information and Retained Data Information are logically separated. In particular, a first Handover Interface port HI-A 25 may be configured to transport various kinds of administrative, request and response information from/to the Requesting Authority 24 and an organization at the CSP 21 that is responsible for Retained Data matters, identified by an Administration Function 27.

The Requesting Authority 24 may use Handover Interface HI-A 25 to hand over the requests for the retained messaging data towards the Data Retention System 23.

A second Handover Interface HI-B 26 may be configured to transport the retained data information stored in a repository 29 from CSP 21 to Requesting Authority 24.

The individual retained data parameters may be sent to Requesting Authority 24 at least once, if available. To this aim, a Mediation/Delivery function 28 may be provided, for retrieving the retained data from the repository 29 and forward such data to the Requesting Authority 24 in a suitable format through the HI-B 26.

Figure 3:
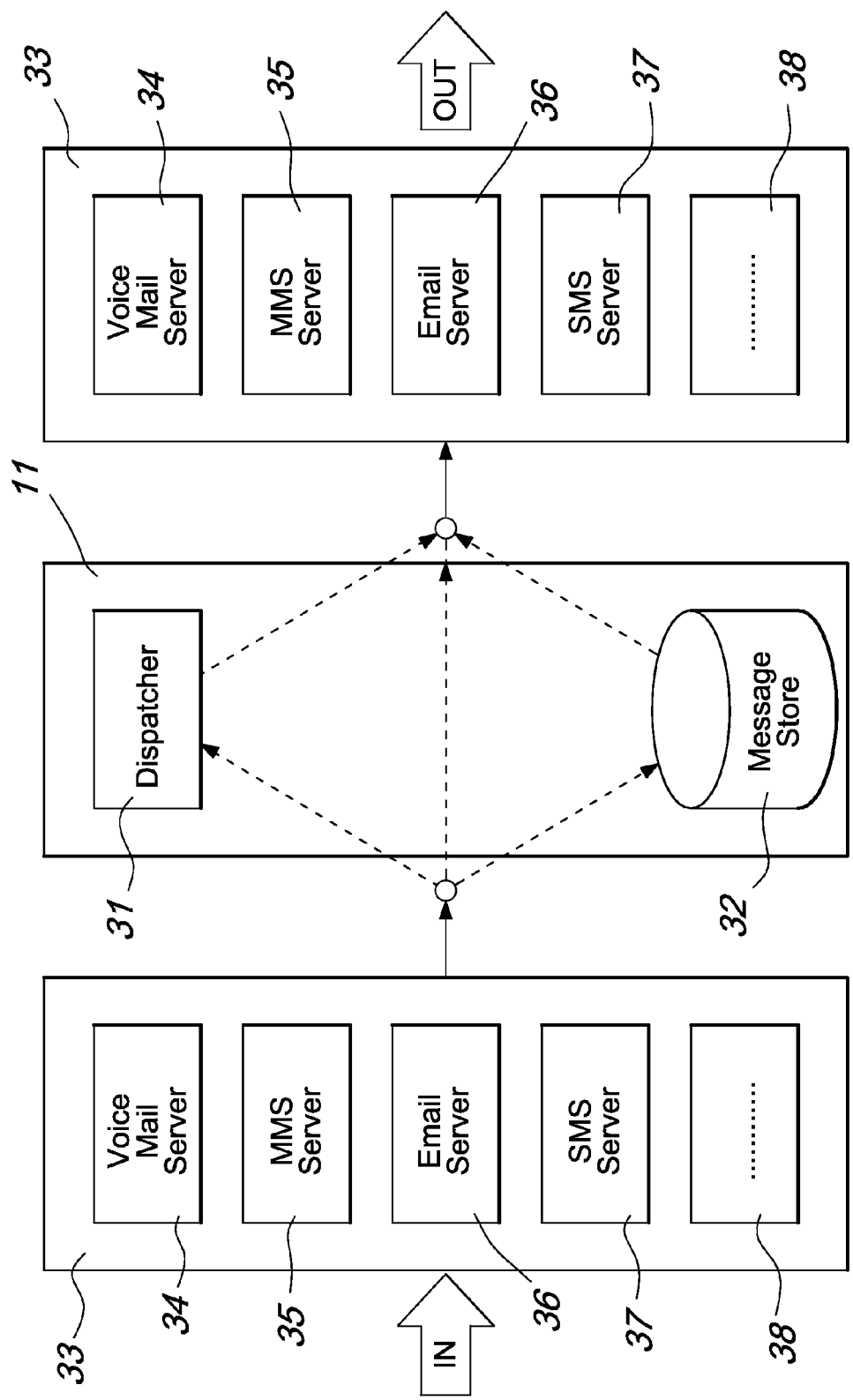
FIG. 3 shows a Messaging Architecture according to the invention.

FIG. 3 shows a Messaging Architecture according to an embodiment of the invention.

Messages flow in the network according to the flow diagram depicted in FIG. 3, where group 33 represents a plurality of messaging servers, each implementing a specific messaging service. Messaging servers may include Voice Mail servers 34, MMS servers 35, Email servers 36, SMS servers 37, and any other kind of servers 38 according to requirements.

For sake of clarity, groups 33 and servers 34, 35, 36, 37 and 38 are shown twice at the two sides of a communication, in order to represent both the incoming and the outgoing side of a message flow.

When a message is received by a corresponding messaging server at the incoming side, the messaging server runs its conventional business logic, for instance by validating the user and screening the message for virus content.

The messaging server then queries Dispatcher 31 in Messaging Gateway 11 for instructions on how the message should be routed to the recipient. The Dispatcher 31 thus acts as a route resolver, determining which messaging server should be used to deliver the message, for instance by checking recipient's capabilities or preferences. Dispatcher 31 may then reply with an indication of the preferred routing.

Every user may have a mailbox in Message Store 32, which acts as a repository in connection with Messaging Gateway 11 to hold user related messages. The mailbox may contain subordinate folders such as, for instance, an inbox and an outbox. Messaging Gateway 11 may thus store the incoming message in the recipient's inbox within Message Store 32, while Dispatcher 31 determines in which form the message should be dispatched.

Dispatcher 31 may schedule an event related to the delivering of the message. When the messaging server receives acknowledgment from Dispatcher 31 that the dispatcher has taken over the responsibility for delivering the message, the Messaging Server signals the sender that the message has been accepted and will be delivered. The Messaging Server, at the incoming side, has now completed its task.

In one embodiment the message may be delivered directly by the Messaging Server, without storing it in Message Store 32.

When the event scheduled by Dispatcher 31 is triggered, Dispatcher 31 selects a messaging server capable of handling a message to the recipient in the previously determined format, and asks it to deliver the message.

The selected Messaging Server, at the outgoing side, begins the process of message delivery. The message is fetched from the recipient's inbox in Message Store 32 and delivered to the recipient.

Figure 4:
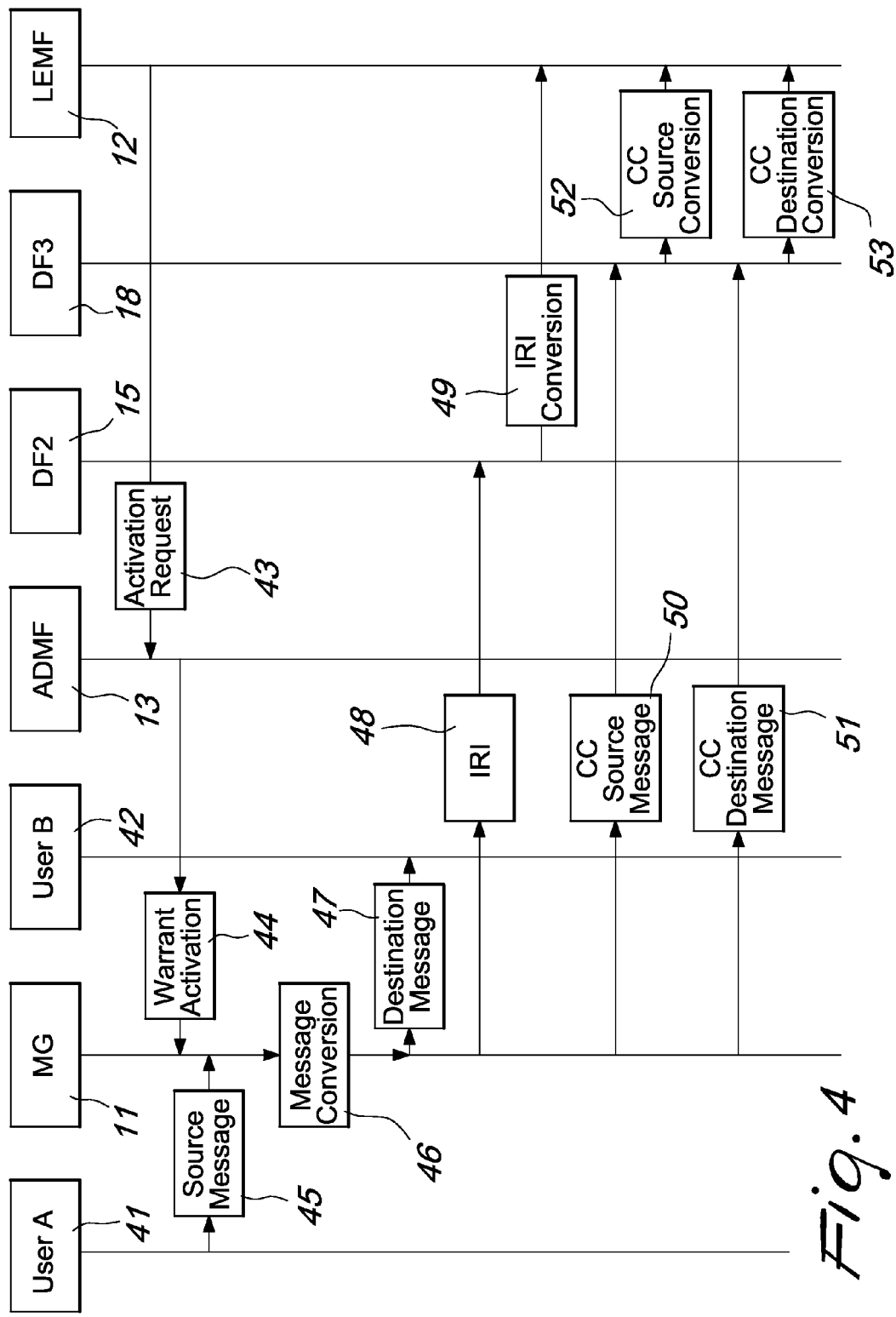
FIG. 4 shows the operation of the Lawful Interception management system according to a preferred embodiment of the invention.

FIG. 4 refers to a Lawful Interception management system according to an embodiment of the invention, for recovering the information about both an original and a converted message.

At step 43, LEMF 12 sends an activation request to ADMF 13 for an interception on target user 42, referred to as User B. According to this request, at step 44 ADMF 13 may activate a warrant in Messaging Gateway 11.

A source message 45 intended to be sent from a sender 41, referred to as User A, to target user 42 arrives at Messaging Gateway 11.

Dispatcher 31 verifies whether the format of the source message is compatible with the capabilities of target user 42. In case the source message is in a format that cannot be received by target user 42, for instance because target user 42 subscribes to a less advanced or different messaging service, at step 46 the message is converted into destination message 47. If necessary, part of the content of source message 45 may be discarded. For instance, if source message 45 is an MMS message containing a picture, such picture cannot be transferred to a target user 42 if target user 42 is only able to receive an SMS. However, even if User B 42 is capable of receiving messages encoded in the format selected by User A 41, User B 42 may require that a message is in any case converted and delivered in a different format.

No message conversion occurs if the message is to be forwarded to target user 42 in the same format provided by sender 41.

At next step, destination message 47, which indicates the message after conversion, is delivered to User B 42. User B 42 may be warned in the same or in a separate message that source message 45 was converted and/or that part of its content has been discarded.

Messaging Gateway 11 may generate and send Intercept Related Information IRI 48 to DF2 15, including information referred to both source message 45 and destination message 47.

At step 49, DF2 15 may convert IRI 48 into a required standard format. Relevant information is then transferred to LEMF 12.

Messaging Gateway 11 may also generate Content of Communication. In this case, the information may be divided over different CC messages, in particular over a first CC message 50 referred to the source message 45 and a second CC message 51 referred to destination message 47.

Such different CC messages 50 and 51 may be passed to DF3 18. At steps 52 and 53, DF3 18 may convert the first CC message 50 and the second CC message 51 into a required or standard format, before forwarding these pieces of information to LEMF 12.

The content of a warrant may trigger a choice to send LEMF 12 information related to the content of original message 45 only, information related to the content of converted message 47 only, or information related to the content of both source and destination messages.

FIG. 5 refers to the Data Retention management system according to an embodiment of the invention, arranged to allow recovering of information related to both an original and a converted message.

When a source message 63 intended to be sent from a sender 41, referred to as User A, to target user 42 arrives at Messaging Gateway 11, Dispatcher 31 verifies whether the format of the source message is compatible with the capabilities of target user 42. In case the source message is in a format that cannot be received by target user 42, for instance because target user 42 subscribes to a less advanced or different messaging service, at step 64 the message is converted into destination message 65. If necessary, part of the content of source message 63 may be discarded. For instance, if source message 63 is an MMS message containing a picture, such picture cannot be transferred to a target user 42 if target user 42 is only able to receive an SMS. However, even if User B 42 is capable of receiving messages encoded in the format selected by User A 41, User B 42 may require that a message is in any case converted and delivered in a different format.

Destination message 65 is then delivered to User B 42.

FIG. 5 shows that Messaging Gateway 11 provides Message Data Records 66, including conversion information, to Data Retention System Mediation Function/Delivery Function 28.

Data Records After Mediation 67 may be transferred from DRS MF/DF 28 and stored in Data Retention System Storage 29. The information stored in Data Retention System Storage 29 may comprise information indicating that source message 63 as sent by sender 41 has been converted to destination message 65 before reaching target user 42.

Steps 63 through 67 may be executed for any incoming message.

Any moment in time, LEA 24 may submit (step 68) a request to query the data retention database for retrieving information concerning target user 42. The query may be received by ADMF 27 and passed on to Data Retention System Mediation Function/Delivery Function 28 through DRS Storage 29.

At step 69, DRS MF/DF 28 delivers the results of the query to LEA 24, through HI-B 26. The requested data may include information concerning message conversion from source message 63 to destination message 65.

Law Enforcement Agencies can thus query the database containing retained data and access information indicating both the kind of format of the original message, as intended by the sender, and the kind of format of the destination message, as actually received at the recipient's side.

According to a preferred embodiment, Messaging Gateway 11 is an Enriched Messaging Gateway (EMG) as known in the art, containing lightweight messaging servers that provide a suite of interfaces. Lightweight messaging servers may support several network-to-network interfaces (NNI), with associated business logic.

Messaging events may be captured and stored in a Messaging Event Repository (MER). When a subscriber sends or receives a message, for instance MMS, SMS, instant messaging, voice-mail and e-mail messages, EMG 11 may record the specific messaging events in a Charging Data Record (CDR). The triggering events may be based on the incoming and outgoing events that EMG 11 records as the message is processed between the originating and terminating subscribers 41, 42.

Each triggering point may be based on a combination that consists of an <operation> and an <event>.

For an incoming message, a class named <OrigClass> represents the message class of the originating message arriving at EMG 11 as defined by in the message header, for example SMS.

For outgoing message operations, the pair <OrigClass>-<DestClass> may represent the originating message class and destination message class defined in the message header, for example SMS-IM. The operation needs to identify both ends of the transaction, so that the CDR contains all the data that the operator may require to bill the appropriate subscriber.

Table 1 describes the operations and events that make up the triggering point used to generate CDR data, as applicable to the instant invention. The trigger points apply to all types of messages handled by EMG.

TABLE 1

| Operation | Event | Description |
|---|---|---|
| <OrigClass> | Incoming.ok | A message has been received and stored successfully |
| <OrigClass> | Incoming.failed | A message has been received but could not be handled by EMG and therefore rejected |
| <OrigClass>-<DestClass> | Outgoing.ok | A message has been delivered successfully through one of EMG outgoing interfaces |
| <OrigClass>-<DestClass> | Outgoing.failed | A message has failed to be delivered |
| <OrigClass>-<DestClass> | Outgoing.expired | A message has expired |

When a message trips one of the triggering points in EMG, the following CDR output may be generated, both in the case of successful or unsuccessful event. CDRs may be generated for all successful reception of SMS messages as follows:

```
<Ericsson.operation name="sms">
    <Ericsson.event name="Incoming.ok">
        <Ericsson.party-to-charge name="None">
            <Ericsson.action name="CDR"/>
        </Ericsson.party-to-charge>
    </Ericsson.event>
</Ericsson.operation>
```

An example of unsuccessful delivery CDR for "SMS-IM" may be as follows:

```
<Ericsson.operation name="sms-im">
    <Ericsson.event name="Outgoing.failed">
        <Ericsson.party-to-charge name="None">
            <Ericsson.action name="CDR"/>
        </Ericsson.party-to-charge>
    </Ericsson.event>
</Ericsson.operation>
```

EMG 11 forwards the CDR to a Message Event Repository (MER). The MER component may be located on a so called Radius server. Therefore, to ensure that MER can receive the CDRs, the IP and port of the Radius server connecting to EMG should he defined.

The operator can download CDRs from MER over an FTP connection. A CDR may contain a set of fields for storing message data that can be used by the operator to bill the customer. The information stored in these fields may be based on a set of Radius and Vendor (operator) specific attributes described in the following tables. Attributes designated as mandatory should be defined to capture key information required for generating a CDR.

Table 2 describes Radius attributes according to an exemplary embodiment of the invention along with a listing of their associated ASN.1 and ASCII tag IDs.

TABLE 2

| Field | Description | ASN.1 Value | ASCII Tag | Type | Mandatory |
|---|---|---|---|---|---|
| Message ID | The generated message ID | 1 | mi | String | Yes |
| EMG-NAS-Port | The RadiusAccess serverport | 5 | po | Number | |
| Class | The class subscription | 25 | cl | String | |
| Originator | "From" field | 31 | cg | String | |
| EMG-NAS-Identifier | TN ID | 32 | ni | String | Yes |
| Account-Status-Type | Start/Stop indicator | 40 | ty | Number | |
| CDR-Transaction-Id | The unique Accounting ID | 44 | id | String | Yes |

Table 3 lists the operator specific attributes that may be included in the CDR. These attributes may be packed as a sequence of Vendor-Type/Vendor-Length/Value triples, following the initial Type, Length and Vendor-ID fields.

TABLE 3

| Field | Description | ASN.1 Value | ASCII Tag | Type | Mandatory |
|---|---|---|---|---|---|
| Layer-Specific-Attribute | The EMG product indicator | 0 | it | Number | |
| Message-Type | Type of message | 1 | et | Number | Yes |
| Destination | "To" field | 2 | de | String | Yes |
| Message-Size | Size of message | 3 | sz | Number | |
| Duration-of-Storage | The difference between reception and delivery or expiration time | 4 | ds | Number | |
| Delivery-Time | The time when the message is successfully delivered | 6 | dt | Time | |
| Submission-Time | The time when the message is received in the EMG | 7 | st | Time | |
| Expiration-Time | Time the message is going to expire | 8 | ex | Time | |
| Message-Priority | The priority of message | 9 | mp | Number | |
| Message-Content | Message content type | 11 | mo | String | |

TABLE 3-continued

| Field | Description | ASN.1 Value | ASCII Tag | Type | Mandatory |
|---|---|---|---|---|---|
| EMG-S-Identifier | EMG system name | 14 | in | String | Yes |
| CDR-Record-Type | The destination direction of message and the interface it uses | 15 | rt | String | Yes |
| Event-Disposition | The reason why the charging event occurs | 19 | ed | Number | Yes |
| GMT-Offset | The difference between local and Greenwich time in seconds | 41 | go | String | |
| Trigger-Point | The trigger point defined in the configuration file | 42 | tp | String | |
| Original-Message-Size | Size of original received message | 44 | os | Number | |
| Service-Correlation-Id | The Id used to correlate charging information between EMG and the sending/receiving nodes | 61 | si | String | |
| Number-Of-Messages | The number of received or sent messages for stored MFS message | 62 | nm | Number | |

A MER component may receive and store event messages from other components in the system and produce Charging Data Records (CDRs). These CDRs can then be used for billing or statistical purposes. The CDRs may be stored in files in an ASCII repository, stored in files in an ASN.1/BER repository, or transferred directly to an external server using the RADIUS Accounting protocol.

In order to apply the invention in the context of 3GPP, ETSI and ANSI standards for the handover interfaces and for the interception domain, main parameters for HI2 16 and HI3 20 can be used as shown in Tables 4 and 5, respectively.

TABLE 4

| Message attributes | Description |
|---|---|
| Message-Type | e.g. sms, mms, e-mail, im, voice-mail, fax, ... |
| Message-Event-Type | e.g. send, store, retrieve, login, logout, invite to messaging, join, leave, ... |
| Message-Event disposition | e.g. modified, stripped out, copied, ... |
| Message-Sender | e.g. text, MSISDN, e-mail address, IP address, ... |
| Message-Recipients | Sequence of recipient info e.g. text, MSISDN, e-mail address, IP address, ... |
| Protocol | e.g. HTTP, WSP, SMPP, SMTP, IMAP4, POP3, ... |
| Time Of Event | Date and Time of the message event |
| Message Content | Text, Voice, Video, Image, Binary, ... |
| Message Size | Size of message (in octets) |
| ... | |

TABLE 5

| Message attributes | Description |
|---|---|
| Message-Format | e.g. IP-packet, application |
| Original-content | Original message content before modification |
| Modified-content | Message content after conversion |
| ... | |

With regard to Data Retention, a Handover Interface may be enhanced as shown in Table 6 to deliver to requesting LEA 24 results including conversion information as originated by Enriched Messaging Gateway 11.

TABLE 6

| Message attributes | Description |
|---|---|
| Message Event disposition | e.g. modified, stripped out, copied, ... |
| Message Type | Multimedia Message, Instant message, Group message, ... |
| Original Message Content | e.g. text and video |
| Modified Message Content | e.g. text |
| Original Message Size | Original Size of message (in octets) |
| Modified Message Size | Size of message after conversion (in octets) |
| Client Type | e.g. PC, laptop, |
| ... | |

It has been thus shown that the invention fully achieves the intended aim and objects, since it gives the possibility to know the content of an original message, for interception purposes, even if the target user has received a converted message with a different amount of information than contained in the original message.

Clearly, several modifications will be apparent to and can be readily made by the skilled in the art without departing from the scope of the present invention. Even though the exemplary embodiments have been discussed indicating the recipient as the target of interception activity, the same description and considerations apply if the target user is sender 41.

Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A method for use in a telecommunications network for providing law enforcement agencies with interception or retention data related to the content of a source message to or from a target user, the method comprising the step of configuring a messaging gateway to operate as an Intercepting Control Element or a Data Retention source and the steps of, at the messaging gateway:

receiving from a messaging server a source message generated by a sender user (A) and addressed to a recipient (B) and coded in a first format, wherein the target user is either sender (A) or recipient (B);

converting said source message into a destination message, coded in a second format, to the recipient, wherein the recipient does not receive said source message in said first format;

generating interception information data including information referring to both the source message and the destination message; and sending said interception information data to a Delivery Function, for being forwarded to a Law Enforcement Agency.

2. The method according to claim 1, comprising the step of provisioning a warrant to said messaging gateway to initiate interception on a target user.

3. The method according to claim 1, wherein the step of generating interception information data comprises generating Intercept Related Information and Content of Communication, wherein said Intercept Related Information includes information related to the target user's identity and telecommunications information related to the target user's identity, further including call information, which includes a number of unsuccessful call attempts, and service associated information, including service profile management by subscriber and location information.

4. The method according to claim 3, wherein the step of generating Content of Communication comprises generating first information related to said source message including content of said source message in said first format, and second information related to said destination message including content of said destination message in said second format.

5. The method according to claim 4, comprising selectively generating said first information including content of said source message or said second information including content of said destination message according to a content of said warrant.

6. The method according to claim 1, further comprising the step of converting said interception information data into a format requested by law enforcement agencies.

7. A messaging gateway configured to operate as an Intercepting Control Element for a Lawful Interception system and configured to perform the steps of:

receiving from a messaging server a source message generated by a sender user (A) and addressed to a recipient (B) and coded in a first format, wherein a target user is either sender (A) or recipient (B);

converting said source message into a destination message, coded in a second format, to the recipient, wherein the recipient does not receive said source message in said first format;

generating interception information data including information referring to both the source message and the destination message; and sending said interception information data to a Delivery Function of a Lawful Interception system.

8. A Lawful Interception system for interception or retention of data related to a target user in a telecommunications network, the system comprising one or more messaging gateways according to claim 7, wherein the target user is either sender (A) or recipient (B).

9. A telecommunications network comprising a Lawful Interception system according to claim 8.

10. A messaging gateway configured to operate as a Data Retention source for a Lawful Interception system and configured to perform the steps of:

receiving from a messaging server a source message generated by a sender user (A) and addressed to a recipient (B) and coded in a first format;

converting said source message into a destination message, coded in a second format, to the recipient, wherein the recipient does not receive said source message in said first format;

generating interception information data including information referring to both the source message and the destination message; and sending said interception information data to a Delivery Function of a Lawful Interception system.

\* \* \* \* \*

UNITED STATES PATENT AND TRADEMARK OFFICE
CERTIFICATE OF CORRECTION

PATENT NO. : 8,782,283 B2
APPLICATION NO. : 13/147508
DATED : July 15, 2014
INVENTOR(S) : Attanasio Page 1 of 1

It is certified that error appears in the above-identified patent and that said Letters Patent is hereby corrected as shown below:

In the Specification

In Column 4, Line 59, delete "outhox." and insert -- outbox. --, therefor.

In Column 8, Line 13, delete "he" and insert -- be --, therefor.

Signed and Sealed this
Twelfth Day of May, 2015

Michelle K. Lee
*Director of the United States Patent and Trademark Office*